Patented Sept. 5, 1933

1,925,381

UNITED STATES PATENT OFFICE 1,925,381

GLASS AND PROCESS OF MAKING SAME

Philip E. Harth, St. Louis, Mo., assignor to National Pigments and Chemical Company, St. Louis, Mo., a corporation of Missouri No Drawing. Application February 7, 1931
Serial No. 514,312

6 Claims. (Cl. 106—36.1)

This invention relates generally to the production of glass and particularly to the production of bottle glass having a minimum solubility.

In the production of glass, and particularly glass which is for bottles or other glassware, it has heretofore been the practice to incorporate as an ingredient of the batch a quantity of feldspar. The action of the feldspar is well known, glasses resulting from processes in which feldspar is employed being hard and tough, and the presence of alumina in the feldspar is reputed to be effective in preventing devitrifaction of the glass. A typical feldspar employed in glass manufacture, however, contains in addition to substantially 18% alumina and a major component of silica, about 12% of potash and soda. The presence of the potash and soda thus tends to increase the sodium content of the glass, so that a greater quantity of sodium silicate is present in the glass resulting from the process, and, accordingly, the devitrifying action of the alumina is to a great extent defeated by the increase of sodium, so that under ordinary circumstances, feldspar cannot be said to decrease the solubility of glass but to increase the same.

Similarly, the advantageous features of barium glass are well known and well recognized.

The object of this invention, generally stated, is to provide a bottle glass containing both alumina and barium.

Another object of this invention is to provide a process of making glass wherein alumina may be added without increasing the quantity of soluble salt forming materials present.

A more specific object of this invention is to provide a process of making glass wherein barium aluminate is incorporated as an ingredient.

Other objects will become apparent to those skilled in the art when the following description is read.

Typical formulæ for the manufacture of glass, having a substantial content of alumina in accordance with the prior practice and in accordance with the present invention are as follows:

| Glass | A | B |
|---|---|---|
| Sand | 100 | 100 |
| Soda ash | 36 | 35 |
| Limestone | 21 | 21 |
| Feldspar | 5 | |
| Barium aluminate | | 5 |

In the manufacture of glass in accordance with the prior practice, and as designated under A above, the alumina content for glass of this nature has been added through the medium of feldspar, and it is apparent from a comparison of the above formulæ that this invention contemplates the substitution for feldspar of barium aluminate, but it is distinctly to be understood that materials named are merely for the purpose of illustration and that the invention is susceptible of being carried out with other materials.

It is preferable that the barium aluminate be added to the other glass forming materials during the dry mixing process thereof, since the presence of barium is effective to decrease the fluxing time of the mixture, and advantage may only be taken of this feature when the barium aluminate is added to the batch in its dry condition. The barium aluminate is preferably supplied in its free and nearly pure form, so that the undesirable effect of the presence of certain constituent elements of feldspar is entirely eliminated.

From a comparison of the above formulæ, it is apparent that the weight of soda ash necessary for a given batch of glass forming materials is less when barium aluminate is employed, in accordance with this invention, than when feldspar is used, in accordance with the prior practice. By thus decreasing the amount of soda ash required for a batch, it is apparent that the quantity of sodium silicate present in the finished glass will be correspondingly decreased, as will also the fluxing temperature. By thus decreasing the quantity of sodium silicate in the finished glass, the solubility thereof is materially decreased.

Although the invention has been described with particular reference to a specific batch formula, it is to be understood that the foregoing description is merely illustrative and that the terms "sand", "soda ash", "limestone" etc. are used in their illustrative and not in their limiting senses. It is apparent that this invention may be advantageously employed in other processes and subprocesses, and it is to be distinctly understood that such uses as do not depart from the spirit of this invention, although not specifically described herein, are contemplated by and within the scope of the appended claims.

Having thus described the invention what is claimed is:

1. In the art of making glass, the process comprising, mixing glass forming materials including barium aluminate, and fusing the batch.

2. In the art of making alumina glass, the process comprising, adding the alumina to the batch in the form of a barium oxy-compound.

3. In the art of making barium glass, the process comprising, adding barium to the batch in the form of an aluminum oxy-compound.

4. A glass forming batch including barium aluminate as an ingredient thereof.

5. A glass forming batch including as a primary ingredient thereof an oxy-compound of barium and aluminum.

6. A process of manufacturing barium glass comprising, melting barium aluminate with glass forming ingredients.

PHILIP E. HARTH.